(12) United States Patent
Iwanaga et al.

(10) Patent No.: US 9,951,882 B2
(45) Date of Patent: Apr. 24, 2018

(54) HANDWHEEL CAP (71) Applicant: Fujikin Incorporated, Osaka-shi (JP)

(72) Inventors: Yusuke Iwanaga, Osaka (JP); Hidenobu Sato, Osaka (JP); Takahiro Matsuda, Osaka (JP)

(73) Assignee: Fujikin Incorporated, Osaka (JP)

( * ) Notice: Subject to any disclaimer, the term of this patent is extended or adjusted under 35 U.S.C. 154(b) by 0 days.

(21) Appl. No.: 15/112,845

(22) PCT Filed: Feb. 6, 2015

(86) PCT No.: PCT/JP2015/000564
§ 371 (c)(1),
(2) Date: Jul. 20, 2016

(87) PCT Pub. No.: WO2015/129174
PCT Pub. Date: Sep. 3, 2015

(65) Prior Publication Data
US 2016/0341332 A1 Nov. 24, 2016

(30) Foreign Application Priority Data
Feb. 28, 2014 (JP) .................................. 2014-039926

(51) Int. Cl.
*F16K 35/02* (2006.01)
*F16K 31/60* (2006.01)
(Continued)

(52) U.S. Cl.
CPC .............. *F16K 35/02* (2013.01); *F16K 31/60* (2013.01); *F16K 35/04* (2013.01); *F16K 7/00* (2013.01)

(58) Field of Classification Search
None
See application file for complete search history.

(56) References Cited

U.S. PATENT DOCUMENTS

| | | | | |
|---|---|---|---|---|
| 1,795,839 A | * | 3/1931 | Credle | ................... F16K 35/06 137/383 |
| 2,838,270 A | * | 6/1958 | Danielson | ............... F16K 31/60 192/46 |

(Continued)

FOREIGN PATENT DOCUMENTS

| | | |
|---|---|---|
| CN | 2658511 Y | 11/2004 |
| CN | 201041256 Y | 3/2008 |

(Continued)

*Primary Examiner* — Jessica Cahill
*Assistant Examiner* — Daphne M Barry
(74) *Attorney, Agent, or Firm* — The Webb Law Firm (57) ABSTRACT

Provided is a cap for a handwheel that opens and closes a valve, capable of being readily attached to the handwheel without requiring a large space around the handwheel. The cap has easily switchable two working modes: One is a co-rotation mode where the cap is capable of rotating with the handwheel and the other is an independent rotation mode where the cap is capable of rotating independently of the handwheel. The cap has an internal casing to be securely fitted to the handwheel; an external casing being rotatable around its axis and having the internal casing in an interior thereof; a clutch for connecting the external casing with the internal casing and for disconnecting the former from the latter; and a maintaining member for keeping the external casing rotatable independently of the internal casing when they are disconnected by the clutch.

2 Claims, 6 Drawing Sheets (51) Int. Cl.
   *F16K 35/04*   (2006.01)
   *F16K 7/00*    (2006.01)

(56) References Cited

U.S. PATENT DOCUMENTS

| | | | | |
|---|---|---|---|---|
| 3,001,551 A | * | 9/1961 | Wyser | F16K 1/526 |
| | | | | 137/614.11 |
| 3,193,243 A | * | 7/1965 | Billington | F16K 31/047 |
| | | | | 251/96 |
| 4,549,716 A | * | 10/1985 | Warren | F16K 31/60 |
| | | | | 192/69.91 |
| 4,623,120 A | * | 11/1986 | Leighton | F16K 11/04 |
| | | | | 137/315.36 |
| 5,513,831 A | * | 5/1996 | Seward | F16K 35/027 |
| | | | | 192/95 |
| 5,741,003 A | | 4/1998 | Segien, Jr. | |
| 6,382,001 B1 | * | 5/2002 | Neeley | E05B 13/001 |
| | | | | 70/175 |
| 6,769,278 B1 | * | 8/2004 | Chang | E05B 13/005 |
| | | | | 292/350 |
| 7,011,291 B2 | * | 3/2006 | Miklo | F16K 31/60 |
| | | | | 137/382 |
| 2001/0000850 A1 | | 5/2001 | Nishimura et al. | |
| 2009/0146090 A1 | | 6/2009 | Hashimoto et al. | |
| 2010/0155641 A1 | | 6/2010 | Masamura | |

FOREIGN PATENT DOCUMENTS

| | | |
|---|---|---|
| JP | 116581 A | 1/1999 |
| JP | 1151240 A | 2/1999 |
| JP | 2000230667 A | 8/2000 |
| JP | 20025332 A | 1/2002 |
| JP | 2006300321 A | 11/2006 |
| JP | 2008190722 A | 8/2008 |
| JP | 2009103320 A | 5/2009 |
| JP | 2010144874 A | 7/2010 |
| JP | 2011208726 A | 10/2011 |

* cited by examiner

HANDWHEEL CAP

CROSS-REFERENCE TO RELATED APPLICATIONS

This application is the United States national phase of International Application No. PCT/JP2015/000564 filed Feb. 6, 2015, and claims priority to Japanese Patent Application No. 2014-039926 filed Feb. 28, 2014, the disclosures of which are hereby incorporated in their entirety by reference.

TECHNICAL FIELD

The present invention relates to a handwheel cap. More particularly, the invention relates to a handwheel cap capable of being readily attached to a handwheel even if the space surrounding the handwheel is small. The handwheel cap has two working modes: One is a co-rotation mode where the handwheel cap is capable of rotating with the handwheel, and the other is an independent rotation mode where the handwheel cap is capable of rotating independently of the handwheel. Once the handwheel cap is attached to the handwheel, the modes are switchable by a simple operation.

BACKGROUND ART

Conventional technology associated with valves includes a proposal for a cover for a handle of a valve to "prevent wrong operation of a handle of a valve included in the parts of machinery and equipment" (see patent document 1).

Patent document 1 discloses a valve handle cover whose general features are clearly understood from the figures thereof. Specifically, a valve handle cover 2 is in the shape of a box in which a handle 1 of a valve is completely contained. The box-shaped cover is divided into halves along the diameter of the valve. The first half of the cover is fastened to the second halve thereof with a hinge that is placed so as to contact the respective sidewalls of the first and second halves with its shaft on the cutting line. The box-shaped cover is opened and closed by pivoting the halves around the hinge shaft. The halves are pivoted away from each other around the hinge and thus the box is opened. The handle is inserted into the box from the created opening. Then the cover is closed, with the handle therein, by pivoting the halves back until they meet. As a result, the handle is housed in the handle cover 2. Each of the halves is provided with a small projecting plate that has a keyhole. The cover is locked up with a bolt inserted into the keyholes.

Thus the handle is housed in the valve handle cover 2, which permits only people in charge to operate the valve. In other words, the valve is not easily accessible to an unspecified large number of people; even if they try to operate the valve handle by grasping the handle cover with hands, it is impossible for them to move the handle with all their strength. The valve handle cover disclosed in patent document 1 is technically advantageous in this respect. (See paragraphs [0007], [0008], [0011], and [0013], and FIGS. 1 and 2 of patent document 1.) [0004]

The left and right halves of the valve handle cover disclosed in patent document 1 have to be turned around the hinge so as to be parted away from each other, when the operator places the valve in the cover. As a result, the valve handle cover requires a large space expanding perpendicularly to the axis of the valve. Therefore a technical problem of this device is that the valve handle cover cannot be fitted to the valve unless a sufficiently large space is saved around the valve.

Patent document 2 discloses a device for locking a fluid channel opening/closing handle, "comprising a stopper support (12, 22) secured to a main part (5) of a fluid controller, the stopper support having a through hole (19, 23) which tightly receives a main part (5) of a fluid controller; and a stopper (16, 26) non-rotatably mounted on the stopper support (12, 22) and engaged with the fluid channel opening/closing handle (8) to prevent the handle (8) from rotating" (see claim 1 of patent document 2).

The locking device disclosed in patent document 2 is a device for locking the fluid channel opening/closing handle (8) at a position where the valve is fully opened and at a position where the valve is completely closed (see claim 1 of patent document 2). The device has a structure to actively prevent the rotation of the handle.

Patent document 3 discloses a rotary valve, comprising a locking mechanism that enables the valve to keep a fixed degree of opening. The locking makes it possible to prevent erroneous operation. The locking device does not interfere with rotation of the handwheel when the valve is located in a small space. When the user desires to change a valve with no lock mechanism to the same valve with the lock mechanism, and vice versa, they are just required to change handwheels, which means that the valve itself is continuously used regardless of whether or not the locking mechanism is attached to the handwheel. The locking mechanism ensures that the rotary valve is set to the exact position and kept there unmovably, when the fluid channel is opened and closed and when the communicating channel is switched from one fluid channel to another fluid channel. (See paragraph [0001] of patent document 3.)

Patent document 3 discloses a mechanism to make not rotatable the stem of the valve body, or the rotating shaft.

Patent document 4 discloses "a fluid controller including a stopper (26), which comprises a portion (31) for preventing rotation of the handle when it is located at a position where the valve is fully open and a portion (32) for preventing rotation of the handle when it is located at a position where the valve is completely closed" (see claim 1 of patent document 4). The disclosed fluid controller has structures for preventing rotation of the handle when the handle is located at a position where the valve is fully open and at a position where the valve is completely closed.

Patent document 5 discloses a lock device for a valve comprising a guide tube fixed to the handwheel of the stem of the valve and so arranged that the guide tube rotates together with the handwheel in an integrated manner; a locking bar slidably inserted into the inside of the guide tube wherein a lower end of the locking bar projects from a lower opening of the guide tube; and a strike plate for engaging with the locking bar when the locking bar is lowered. The technical idea of this lock device is to actively control the rotation of the rotating stem so that the rotating stem will not move.

Patent document 6 discloses a device for preventing erroneous operation (11), comprising a cover support (12) secured to the main body 2 of a fluid controller; a tubular handle cover (13) supported on the cover support, the tubular handle cover covering a handle (3) for opening and closing a fluid channel; and coupling means (14) for detachably coupling the tubular handle cover (13) to the cover support (12). The device for preventing erroneous operation (11) has a structure that prevents the handle (3) for opening and closing a fluid channel from being turned unless a lock (24) is opened with a key.

Patent document 7 discloses "a lock device for locking a handle (8) for opening and closing a fluid channel at a position where the fluid channel is fully opened or at a position where the fluid channel is completely closed, the handle rotatable in relation to a main body (5) of a fluid controller, the lock device comprising a stopper support (12) (22) secured to the main body (5), the stopper support having a through hole (19) (23) for receiving the main body; and a stopper (16) (26) fixed to the stopper support (12) (22) in such a manner that the stopper is non-rotatable in relation to the main body and is capable of engaging with the handle (8), thereby preventing rotation of the handle." (See claim 1 of patent document 7.)

All of the devices disclosed in patent documents 1-7 have a mechanism to prevent rotation of the rotating shaft of the handle for opening and closing a fluid channel.

PRIOR ART DOCUMENTS

Patent Documents

Patent Document 1: JP 2011-208726 A
Patent Document 2: JP 2008-190722 A
Patent Document 3: JP 2006-300321 A
Patent Document 4: JP 2002-005332 A
Patent Document 5: JP 2000-230667 A
Patent Document 6: JP H11-51240 A
Patent Document 7: JP H11-6581 A

DISCLOSURE OF THE INVENTION

Tasks to be Achieved by the Invention

The objective of the present invention is to provide a cap for a handwheel that controls the opening and closing of a valve, wherein the cap is capable of being readily attached to the handwheel without requiring a large space around the handwheel and the cap has two working modes, one of which is a co-rotation mode where the cap is capable of rotating with the handwheel and the other of which is an independent rotation mode where the cap is capable of rotating independently of the handwheel, and wherein the modes are capable of being effectuated by a simple operation once the cap is attached to the handwheel.

Means to Achieve the Tasks

The means for achieving the tasks provided by the present invention are:
(1) A cap for a handwheel mounted on a rotating shaft and turning the rotating shaft comprising:
  an internal casing to be securely fitted to the handwheel;
  an external casing with the internal casing in an interior of the external casing;
  a clutch for making the external casing rotatable around a rotation axis of the external casing independently of the internal casing and for making the external casing rotatable around the rotation axis together with the internal casing; and
  a maintaining member for keeping the external casing rotatable when the clutch enables the external casing to be rotatable independently of the internal casing.
(2) The cap according to item (1), wherein the clutch comprises an internal casing-side toothing formed on a rim of the internal casing that faces the external casing and an external casing-side toothing formed on a rim of the external casing that faces the internal casing so that the external casing-side toothing meshes with the internal casing-side toothing.
(3) The cap according to item (2), wherein the maintaining member is a mover which is away from the inner case-side toothing and the external casing-side toothing when the inner case-side toothing and the external casing-side toothing mesh with each other, and which is placed between the internal casing-side toothing and the external casing-side toothing when the external casing-side toothing is separated from the internal casing-side toothing.

Advantages of the Invention

The handwheel cap according to the present invention is capable of being attached to the handwheel, with the internal casing of the cap so fitted to the rotating shaft of the handwheel that the internal casing extends along the rotating shaft. Thus the present invention eliminates the necessity of space expanding in the directions perpendicular to the rotating shaft of the handwheel for the attachment of the cap to the handwheel. The handwheel cap according to the present invention is provided with the clutch capable of making the external casing rotatable around the rotation axis thereof independently of the internal casing, and also with the maintaining member capable of keeping the external casing rotatable in relation to the internal casing, or independently of the internal casing. As a result, when rotating force is applied to the external casing and the external casing is rotated, the rotation of the external casing is not transmitted to the internal casing, which achieves the state where only the external casing is rotated with the internal casing remaining unrotated. On the other hand, when the internal casing and the external casing are co-rotated by means of the clutch and the maintaining member, the handwheel is also rotated. The diameter of the external casing is larger than that of the handwheel, which reduces turning force necessary to rotate the handwheel.

The clutch according to this invention comprises an internal casing-side toothing formed on a rim of the internal casing that faces the external casing and an external casing-side toothing formed on a rim of the external casing that faces the internal casing so that the external casing-side toothing meshes with the internal casing-side toothing. The engagement between the internal casing-side toothing and the external casing-side toothing ensures the transmission of rotating force of the external casing to the internal casing. Thus, the present invention provides a handwheel cap free from such a defect that the external casing idles without transmitting all or part of the turning force to the internal casing when the external casing is rotated.

The maintaining member according to the present invention is a mover which is away from the internal casing-side toothing and the external casing-side toothing when the internal casing-side toothing and the external casing-side toothing mesh with each other, and which is placed between the internal casing-side toothing and the external casing-side toothing when the external casing-side toothing is separated from the internal casing-side toothing. Thus only forward and backward movements of the mover are sufficient to create the state where the internal casing-side toothing meshes with the external casing-side toothing and the state where the external casing-side toothing is separated from the internal casing-side toothing.

EMBODIMENTS TO CARRY OUT THE INVENTION

Fluid controllers to which a handwheel cap, an example of the present invention, is attached will be explained.

Figure 1:
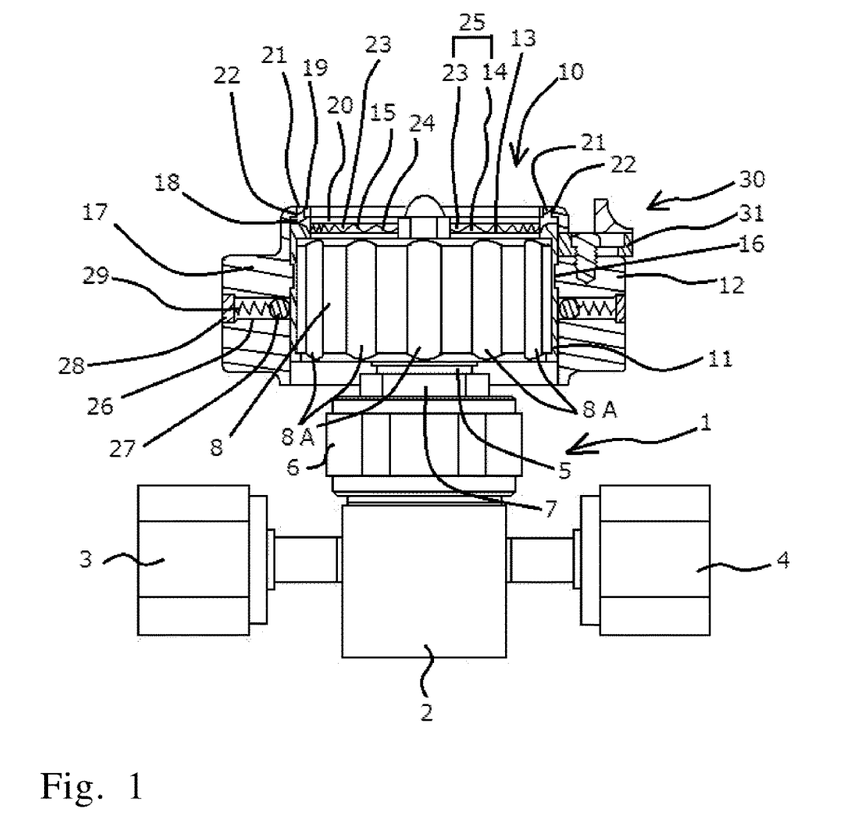
FIG. 1 is an illustration showing a fluid controller equipped with a handwheel cap, which is an example of the present invention, in a state where the external casing rotates together with the internal casing by means of the clutch.
Figure 2:
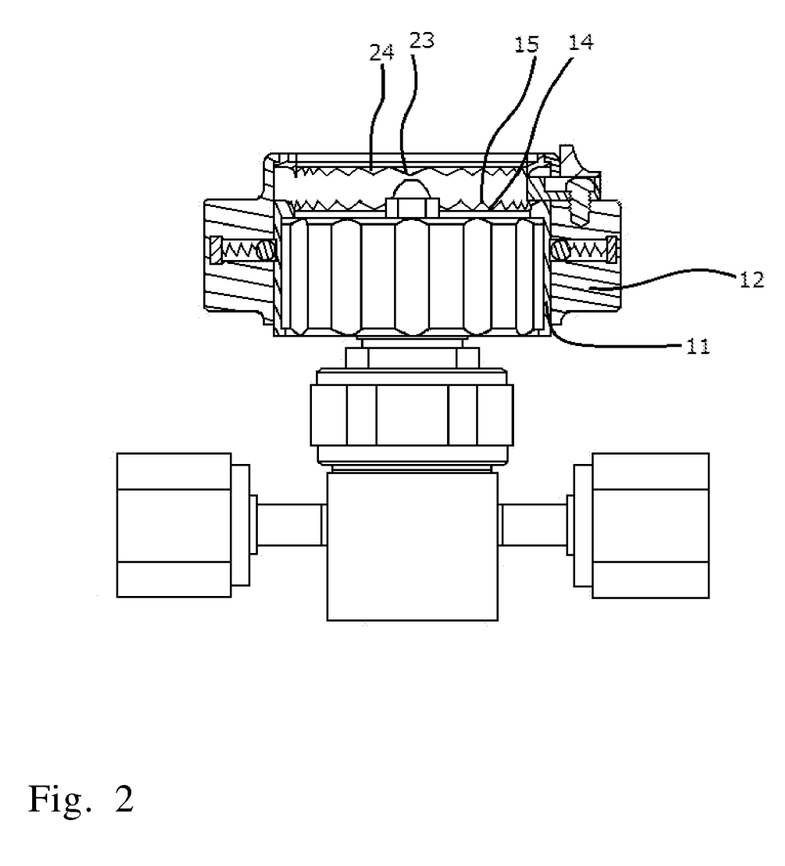
FIG. 2 is an illustration showing a fluid controller equipped with the handwheel cap, which is an example of the present invention, in a state where the external casing rotates independently of the internal casing by means of the clutch.
Figure 3:
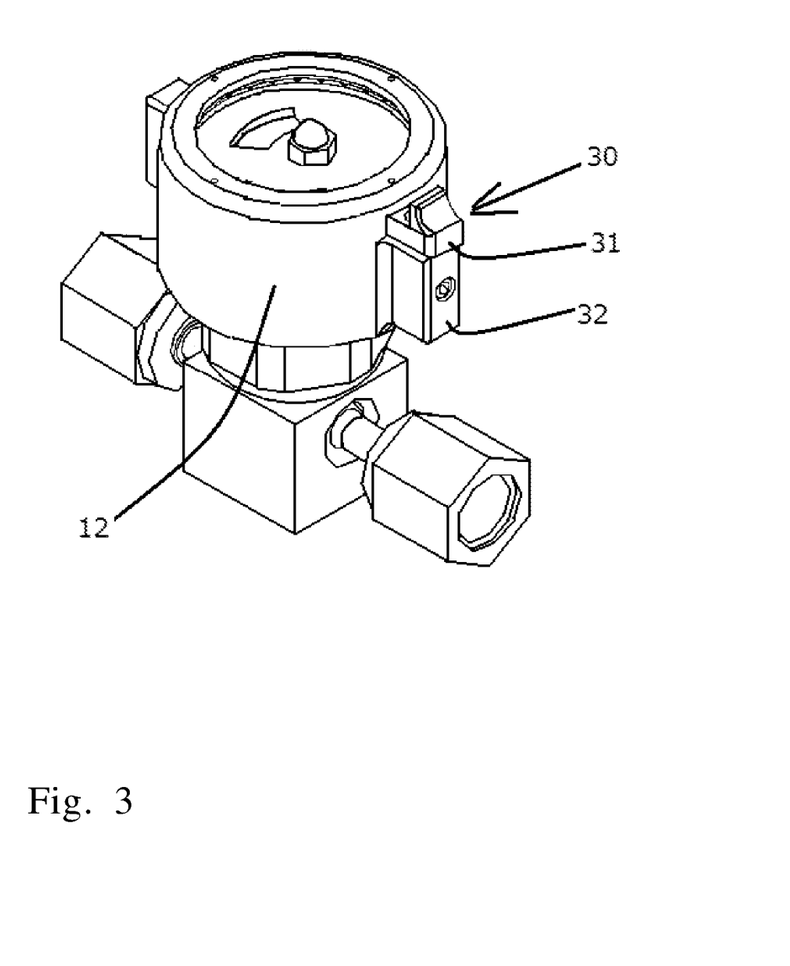
FIG. 3 is a perspective view showing a state where a handwheel cap, which is an example of the present invention, is attached to a fluid controller.

As shown in FIGS. 1-3, a fluid controller 1 may be, for example, a known diaphragm valve which comprises a main body 2 of the fluid controller, which is also called a body, having an inlet joint 3 and an outlet joint 4; a bonnet 5 in the shape of a general tube, the bonnet so fitted to a top part of the main body 2 that the bonnet covers part of the top part; a bonnet nut 6 for fixing the bonnet 5 to the main body 2 of the fluid controller; a panel nut 7 placed around the bonnet 5; a handwheel 8 rotatable clockwise and counterclockwise; a valve stem (not shown in the figures), which is a rotating shaft moving upward and downward according to the rotation of the handwheel 8; and a diaphragm (not shown in the figures) which allows communication between the inlet port and the outlet port, both in the main body 2 of the fluid controller, or blocks the communication depending on upward and downward movements of the valve stem.

As shown in FIGS. 1 and 2, the inlet joint 3 sticks out of the main body 2 of the fluid controller in one direction, for example to the left; the outlet joint 4 sticks out of the main body 2 in another direction, for example to the right. The handwheel 8, when it is viewed from above along a central axis of the rotating shaft, or the valve stem, is formed in the shape of a cylinder with a top end in the shape of a general circle and a circumferential face extending downward along the central axis from the circular edge of the top end. Several longitudinal grooves 8A, running parallel with the central axis, are formed in the circumferential face of the handwheel 8 at predetermined intervals. These grooves 8A serve as a device to prevent the operator's hand and fingers from slipping off the handwheel when s/he rotates the handwheel 8. Clockwise or counterclockwise rotation of the handwheel 8 blocks communication between a fluid channel connected with the inlet joint 3 and a fluid channel connected with the outlet joint 4, or permits the communication.

A handwheel cap 10, which is an example of the present invention, has an internal casing 11 and an external casing 12.

The internal casing 11 is formed in the shape of a hollow cylinder with both ends open, or in the shape of a tube. The inner diameter of one of the open ends is decided so as to make it possible for the internal casing to tightly receive the handwheel 8 in the inside thereof. Also, the longitudinal length of the tubular internal casing 11 along the central axis is decided so as to be a little longer than the longitudinal length of the handwheel. In other words, when the handwheel 8 is inserted into the internal casing 11 and tightly held in it, the internal casing 11 covers the circular edge of the bottom end face of the handwheel 8, and the rim of the one open end of the internal casing is located a little farther than the circular edge of the bottom end face of the handwheel.

Materials for the internal casing 11 are so selected that the handwheel 8 is rotated together with the internal casing 11 when the internal casing is rotated.

Specifically, the internal casing is made of a suitable material with such a degree of elasticity as to enable the handwheel 8 to be fitted to the inside of the internal casing 11 by pushing the handwheel 8 into the inside of the internal casing 11, and also to enable the inner circumferential face of the internal casing 11 to squeeze the handwheel 8 that has been inserted into the internal casing. Also, the material should have such a degree of rigidity that the handwheel 8 is capable of smoothly turning as the internal casing 11 is rotated. When the internal casing 11 is made of a material with proper elasticity and rigidity, the elasticity enables the internal casing 11 to squeeze the handwheel 8 that has been inserted into the internal casing, and the rigidity prevents the internal casing 11 from deforming which may be caused by the turning force when the rotation of the internal casing 11 makes the handwheel 8 rotate. The handwheel to which the present invention is applied may be designed so as to rotate clockwise and counterclockwise, or to pivot predetermined degrees both in the clockwise and counterclockwise directions.

If the internal casing 11 is made of a material with small elasticity but with suitable rigidity and if the handwheel 8 is provided with a locking recess running parallel with the central axis of the handwheel, the locking recess formed in the outer circumferential face thereof, the employment of a locking key capable of fitting in the locking recess, the locking key formed on the inner circumferential face of the internal casing 11, achieves smooth rotation of the handwheel 8 as the internal casing 11 is rotated. The locking recess and locking key is not shown in the figures. In addition to the combination of such a locking groove and locking key, suitable mechanical structures that enable the handwheel 8 to be driven-rotated by the rotation of the internal casing 11 may be employed. In other words, materials for the internal casing 11 and mechanical structures for coupling the handwheel 8 and the internal casing 11 in such a manner that a simultaneous rotation of the handwheel and the internal casing is achieved may be appropriately employed, as long as the handwheel 8 is capable of being inserted into and fitted to the inside of the internal casing 11 by pushing the handwheel 8 into the internal casing 11 along the central axis thereof and the internal casing 11 is capable of being prevented from serious deformation that may be caused by the rotation of the handwheel 8.

An internal casing-side toothing 14 is formed on a rim 13 of the other of the open ends of the internal casing 11 wherein the rim faces the external casing 12, in which this internal casing 11 is housed. The internal casing-side toothing is formed annularly along the rim with its center on the central axis.

The internal casing-side toothing 14 has peaks and bottoms each of which is between two adjacent peaks, wherein each of the peaks and bottoms is on a radial line with its center on the central axis of the internal casing 11. Thus the internal casing-side toothing 14 comprises projections and depressions 15 in the form of alternate peaks and bottoms. The internal casing-side toothing 14, which is in the shape of a disk when it is viewed from above along the central axis, has a circular opening. When the handwheel 8 is inserted into and tightly held in the internal casing 11, a face of the handwheel 8 is seen in the circular opening.

In the outer circumferential face of the tube of the internal casing 11 is annularly formed a positioning recess 16, which makes a full circle along the outer circumferential face with the central axis of the casing made as the center of the circle.

The external casing 12 has a tubular portion 17 in the shape of a hollow cylinder with both ends open, or in the shape of a cylindrical tube, and an annular disk 18.

One of the ends of the tubular portion 17 is open so as to receive the internal casing 11 which may be inserted or fitted into the hollow cylinder. An annular lip 19 is formed on the rim of the other of the open ends. The annular lip 19 has an annular inner face 20 that forms a wall surrounding a round opening through which the top end of the handwheel 8, which is inserted or fitted into the inside of the internal casing 11, which in turn is received in the external casing 12, is exposed. The diameter of the round opening should be arranged to be the same as that of the diameter of the opening of the other end of the internal casing 11, because this arrangement aligns the annular inner face 20 with the inner circumferential wall forming the opening of the other end of the internal casing 11, whereby the operator is able to clearly observe the top end of the handwheel 8 that it not covered with any part of the casings.

The annular disk 18 is provided with mounting protrusions 21 at the upper ring-shaped end of the disk. The annular disk 18 is fixedly mounted on the annular lip 19, which is formed on the other end of the tubular portion 17, by inserting the mounting protrusions 21 into mounting holes 22 pierced in the annular lip 19.

An external casing-side toothing 23 is formed on the face of the annular disk 18 opposite the face on which the mounting protrusions 21 are formed. In other words, the external casing-side toothing 23 is formed on the face of the annular disk 18 that faces the internal casing 11 when the internal casing 11 is housed in the external casing 12. The external casing-side toothing 23 has peaks and bottoms each of which is between two adjacent peaks, wherein each of the peaks and bottoms is on a radial line with its center on the central axis of the external casing 12. Thus the external casing-side toothing 23 comprises projections and depressions 24 in the form of alternate peaks and bottoms. The projections and depressions 24 are so formed that they mesh with the projections and depressions 15 of the internal casing-side toothing 14 of the internal casing 11.

The handwheel cap 10 has a clutch 25 formed by the internal casing-side toothing 14 and the external casing-side toothing 23.

The circumferential wall of the tubular portion 17 of the external casing 12 has ball-fitting holes 26 which penetrate the wall from the outer surface to the inner circumferential surface. The circumferential wall has four ball-fitting holes 26 which are positioned, for example, at every 90 degrees on an imaginary plane perpendicular to the central axis of the tubular portion 17, the holes extending along the radial lines of the tubular portion. Needless to say, the number of ball-fitting holes 26 formed in the circumferential wall of the tubular portion 17 is not limited to four. The number may be two or three. As shown in FIGS. 1 and 2, the two ball-fitting holes 26 have a same shape and each ball-fitting hole is loaded with one ball 27. The ball 27 is biased by a biasing member, such as a coil spring 29, so that the ball is urged toward the inner space of the tubular portion 17. The biasing member is fixed to a fixing and closing member 28 which is mounted on the opening in the outer circumferential face of the tubular portion 17. The opening in the inner circumferential face of the tubular portion 17 has a diameter a little smaller than the diameter of the passage portion, or the internal portion, of the ball-fitting hole 26. Thus the ball 27 is not pushed out from the opening in the inner circumferential face of the tubular portion 17, in spite of being biased by the coil spring 29.

The ball-fitting holes 26 in this example are formed as a hole passing through the external casing 12 from the outer circumferential face thereof to the inner circumferential thereof, because the wall thickness of the tubular portion 17 is large. When the tubular portion 17 does not have an enough wall thickness to contain a ball 27 in it, a suitable fitting attachment in which a ball-fitting hole 26 is formed may be employed to ensure a sufficient thickness to contain a ball 27 and a biasing member, as shown in FIGS. 3-6.

When the internal casing 11 is completely housed in the external casing 12, the balls 27 urged by the respective coil springs 29 press the outer circumferential face of the internal casing 11, as shown in FIG. 1. When the external casing 12 is moved along the central axis of the external casing 12 in such a manner that the external casing 12 is drawn from the internal casing 11, the balls 27 roll on the outer circumferential face of the internal casing 11 according to the movement of the external casing 12 until the balls 27 fall in the positioning recess 16. Even when the operator tries to further pull the external casing 12 away from the internal casing 11, the external casing 12 cannot be pulled off the internal casing 11 as long as the urging force of the coil springs 29 is larger than the pulling force. Thus the internal casing 11 is kept housed in the external casing 12.

The external casing 12 is made so as to be capable of fully or partially rotating over the outer circumferential face of the internal casing 11 around the central axis thereof and of smoothly translating over the outer circumferential face of the internal casing 11 along the central axis thereof. When the inner circumferential face of the external casing 12 contacts the outer circumferential face of the internal casing 11, the material for the external casing 12 should appropriately be selected from materials with small sliding friction so that the inner circumferential face of the external casing 12 is capable of smoothly moving on the outer circumferential face of the internal casing 11.

The external casing 12 is provided with a maintaining member 30, an example of the present invention. As illustrated in FIGS. 1-6, the maintaining member 30 may be a mover, such as a pin 31, which is away from the internal casing-side toothing 14 and external casing-side toothing 23 when the toothings are made to engage, e.g. to mesh, with each other, and which is headed inward and placed between the internal casing-side toothing 14 and the external casing-side toothing 23 when the toothings are separated.

Figure 4:
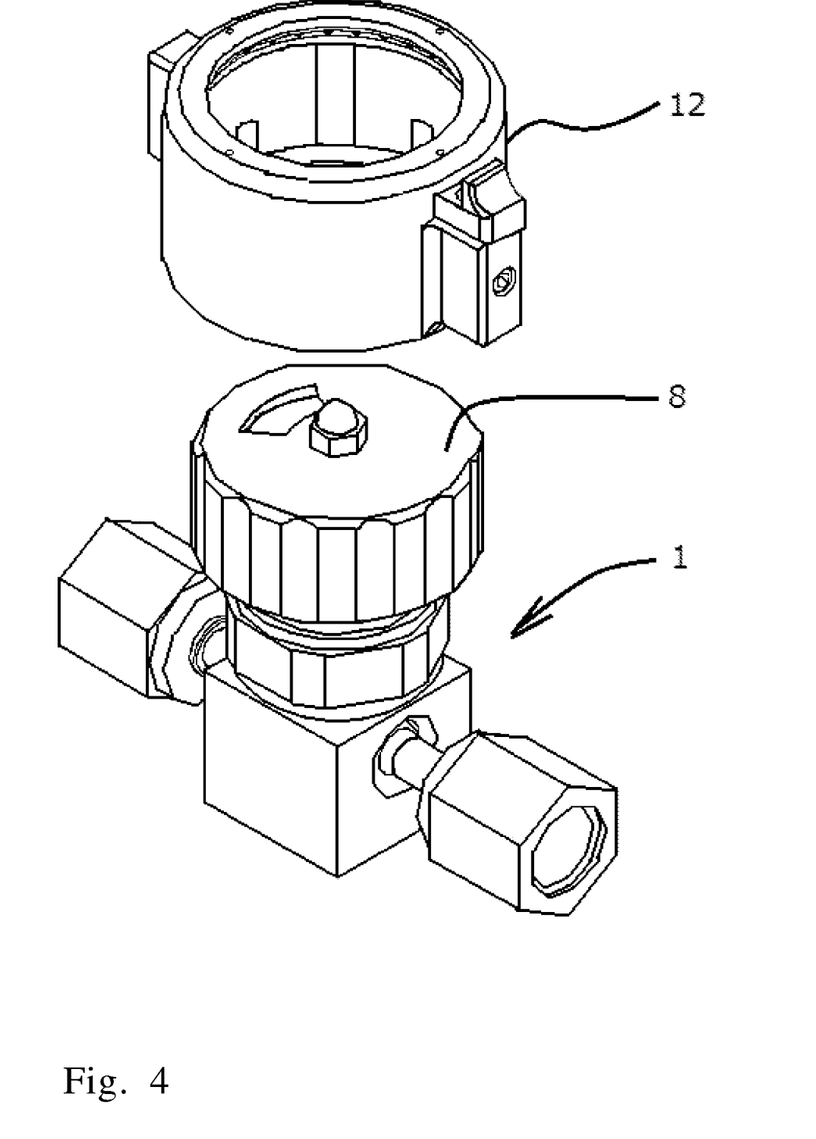
FIG. 4 is a perspective view showing a state where the handwheel cap, which is an example of the present invention, is detached from a fluid controller.
Figure 5:
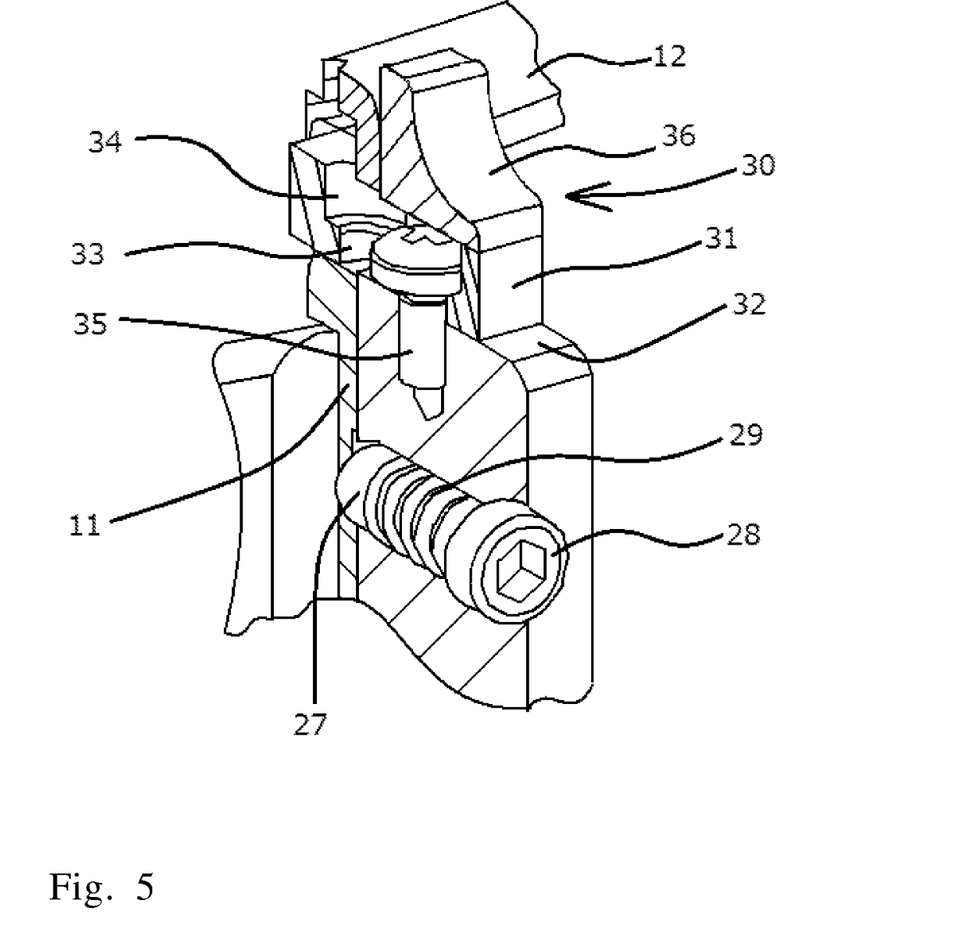
FIG. 5 is a partially enlarged and partially cut away view showing a maintaining member of a handwheel cap, which is an example of the present invention, in a state where the external casing is rotatable independently of the internal casing by means of the clutch.

As illustrated in FIGS. 3-5, the pin 31 is placed on a mounting member, for example a mounting base 32, so formed on the outer circumferential face of the external casing 12 that the mounting base projects from the outer circumferential face.

Figure 6:
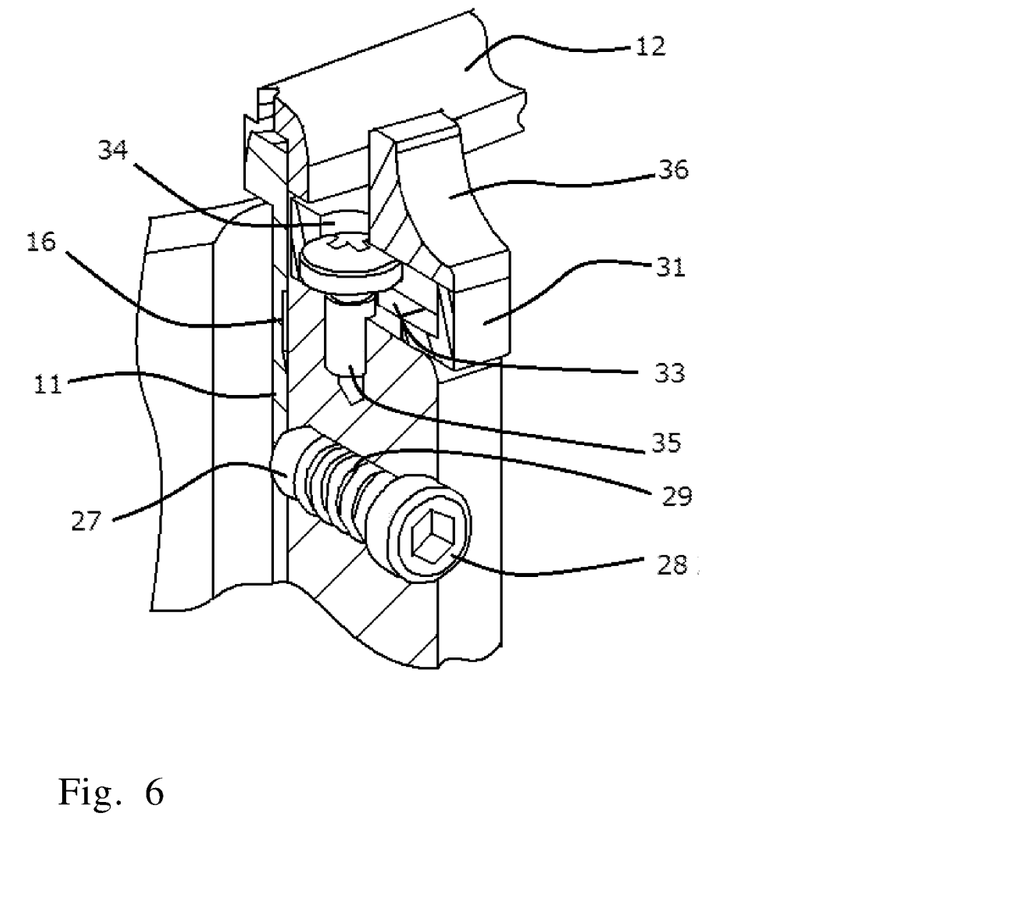
FIG. 6 is a partially enlarged and partially cut away view showing the maintaining member of a handwheel cap, which is an example of the present invention, in a state where the external casing is not rotatable independently of the internal casing by means of the clutch.

The mounting base 32, in this example, is in the shape of a box and is formed on the outer circumferential face of the external casing 12 so as to project therefrom. On the top face of the mounting base 32, included in a plane perpendicular to the central axis of the external casing 12, is placed the pin 31 which is capable of moving on the top face in both directions, toward the central axis and away from it. As shown in FIGS. 5 and 6, the pin 31 has a guide groove 34 extending along the radius of the external casing 12 and an elongated through hole 33 which is formed in the bottom of the guide groove 34 and runs through the bottom wall of the pin 31 from the guide groove. A fixing screw 35 is inserted into the through hole 33 and therefore is placed in the guide groove 34. The fixing screw 35 is fixed into the mounting base 32 on which the pin 31 is mounted by, for example, threaded engagement. Thus the fixing screw 35 makes the pin 31 captive to the mounting base 32. The length of the pin 31 in the direction of movement and the length of the guide groove 34 are suitably decided such that the leading edge of the pin 31 comes between the external casing-side toothing 23 and the internal casing-side toothing 21, which faces the external casing-side toothing 23 when the pin 31 moves on the mounting base 32 toward the central axis to its limit, and the leading edge is not placed in the gap between the external casing-side toothing 23 and the internal casing-side toothing 21 when the pin 31 moves on the mounting base 32 away from the central axis to its limit.

The pin 31 is provided with an operation piece 36. The operator is able to easily move the pin 31, for example, by pushing the operation piece 36 with a finger of by holding it between his/her fingers.

The handwheel cap 10 works in the following way.

At the initial stage, the handwheel cap 10 is, as shown in FIG. 1, in a state where the internal casing 11 is completely housed in the external casing 12, the internal casing-side toothing 14 engages with the external side-casing toothing 23, and the internal casing 11 and the external casing 12 are united in a single body.

As illustrated in FIG. 4, the handwheel cap 10, an example of the present invention, is fitted to a handwheel 8 of a fluid controller 1.

The operation of fitting the cap 10 to the handwheel 8 is easy. It is because the fitting just requires placing the cap 10 over the handwheel 8 with their central axes generally aligned and making the cap 10 advance along the central axes onto the handwheel 8. In short, the cap 10 is pushed onto the handwheel 8 so that the handwheel 8 is housed in the cap 10.

When the cap is completely pushed onto the handwheel, the outer circumferential face of the handwheel 8 is in contact with the inner circumferential face of the internal casing 11. Also, the internal casing-side toothing 14 and the external casing-side toothing 23 are engaged with each other and the handwheel 8 is housed inside the internal casing 11. When the external casing 12 of the cap in this state is turned around the central axis thereof, the handwheel 8 is turned as well. The diameter of the external casing 12 is larger than that of the handwheel 8, which enables the operator to turn the handwheel 8 with less force.

Then, the operator is required to hold the external casing 12 and to pull it from the internal casing 11 along the central axis of the internal casing 11. If the inner circumferential face of the external casing 12 is in contact with the outer circumferential face of the internal casing 11, the balls 27 roll on the outer circumferential face of the internal casing 11, which enables the operator to translate the external casing 12 without feeling much friction and to pull the external casing 12 in the direction where the external casing would eventually be pulled away from the internal casing 11. As the external casing 12 is moved over the internal casing 11, the balls 27 fall in the positioning recess 16. When the balls 27 fall in the positioning recess 16, the impact of the falling is transmitted to the operator's fingers. Then, the operator stops pulling the external casing 12 further from the internal casing 11. Even if the operator continues pulling the external casing 12 from the internal casing 11 in spite of feeling the impact, s/he is not able to pull the external casing 12 any further because the balls 27 are caught in the positioning recess 16.

As illustrated in FIG. 2, the projections and depressions 15 of the internal casing-side toothing 14 of the internal casing 11 are away from the projections and depressions 24 of the external casing-side toothing 23 of the internal casing 12, or the former do not engage with the latter, when the balls 27 are caught in the positioning recess 16.

At this point, the maintaining member 30 is in the initial state where the pin 31 is away from the internal casing-side toothing 14 and the external casing-side toothing 23.

Then, the operation piece 36 is pressed toward the external casing 12 by pushing the operation piece 36, for example with a finger. The pin 31, which is united with the operation piece 36, is moved toward the central axis of the external casing. The internal casing-side toothing 14 is separate from the external casing-side toothing 15 with a gap in between, which enables the pin 31 to come into the gap. The guide groove 34 of the pin 31, in the shape of an elongated hole, has the fixing screw 35 in it. When the head of the fixing screw 35 contacts the inner wall of the guide groove 34, this contact prevents the pin 31 from further advancing toward the central axis of the external casing. As illustrated in FIG. 5, when the pin 31 comes to the position where it is prevented from further advancing, it achieves the state where the leading edge of the pin 31 is placed the gap between the internal casing-side toothing 14 and the external casing-side toothing 23.

In the state where the leading edge of the pin 31 is placed the gap between the internal casing-side toothing 14 and the external casing-side toothing 23, the pin 31 between the toothings prevents the external casing 12 from translating toward the internal casing 11. On the other hand, the external casing 12 is rotatable on or over the internal casing 11, because part of each ball 27 is caught in the positioning recess 16 formed in the outer circumferential face of the internal casing 11.

This state, where the external casing 12 is rotatable independently of the internal casing 11, allows the external casing 12 to turn without rotating the internal casing 11, even if turning force is applied to the external casing 12 for some reasons.

When the handwheel cap 10 is not used and a handwheel 8 is exposed to the outside, an application of some turning force or impact to the handwheel 8 might turn it. On the other hand, when the handwheel cap 10 is attached to a handwheel 8, turning force or impact, if applied to the external casing 12, will turn only the external casing 12 and the internal casing 11 and the handwheel 8 will remain unturned. Thus, when the handwheel 8 is set to a position where the valve is open, the covering of the handwheel 8 with the cap 10 will prevent the handwheel 8 from being displaced from the set position by turning force or impact if it is applied to the external casing 12. When the handwheel

8 is set to a position where the valve is closed, the covering of the handwheel 8 with the cap 10 will also prevent the handwheel 8 from being displaced from the set position by turning force or impact if it is applied to the external casing 12.

Therefore when a handwheel 8 is provided with the handwheel cap 10, the handwheel 8 does not require lock devices in order to keep the handwheel at a set position.

An example of this invention has been explained so far. However, the present invention is not limited to the example.

The clutch and the maintaining member of the handwheel cap according to the present invention may have various embodiments, as long as the handwheel cap is provided with an external casing, an internal casing, a clutch, and a maintaining member, wherein the clutch is capable of achieving both of the state where the external casing and the internal casing engage with each other and the state where they do not engage with each other, and wherein the maintaining member is capable of keeping the external casing disengaged from the internal casing.

In the example explained hereinbefore, the handwheel is in the shape of a cylinder or a disk. However, the handwheel may be a valve handle with such a shape as shown in FIG. 1 of the JP 2011-208726 A publication, or a fluid channel opening/closing handle in the shape of a general ellipse in a plan view, as shown in FIG. 3 or 5 of the JP 2008-190722 A publication. The internal casing should have a device for fixing a handwheel inside the internal casing, irrespective of the shape of the handwheel.

The internal casing and the external casing of the present invention may employ various shapes and structures, as long as the clutch is capable of making the external casing rotatable independently of the internal casing and rotatable together with the internal casing and the internal casing is fixed to the handwheel.

Also, the clutch of the present invention may employ various mechanisms or structures, as long as it is capable of making the external casing rotatable independently of the internal casing and rotatable together with the internal casing.

The mover, an example of the maintaining member, is not limited to the pin. Various mechanical structures may be used for the mover, as long as it is capable of being placed in a gap between the internal casing-side toothing and the external casing-side toothing in order to prevent the toothings from engaging with each other, and capable of being away from the internal casing-side toothing and the external casing-side toothing in order to achieve the engagement between the toothings.

EXPLANATION OF REFERENCE SIGNS

1 fluid controller
2 main body of the fluid controller
3 inlet joint
4 outlet joint
5 bonnet
6 bonnet nut
7 panel nut
8 handwheel
8A longitudinal grooves
10 handwheel cap
11 internal casing
12 external casing
13 rim
14 internal casing-side toothing
15 projections and depressions
16 positioning recess
17 tubular portion
18 annular disk
19 annular lip
20 annular inner face
21 mounting protrusions
22 mounting holes
23 external casing-side toothing
24 projections and depressions
25 clutch
26 ball-fitting holes
27 ball
28 fixing and closing member
29 coil spring
30 maintaining member
31 pin
32 mounting base
33 through hole
34 guide groove
35 fixing screw
36 operation piece

We claim:

1. A cap for a handwheel mounted on a rotating shaft and turning the rotating shaft comprising:
   an internal casing to be tightly fitted to the handwheel;
   an external casing with the internal casing in an interior of the external casing;
   a clutch for making the external casing rotatable around a rotation axis of the external casing independently of the internal casing and for making the external casing rotatable around the rotation axis together with the internal casing; and
   a maintaining member for keeping the external casing rotatable when the clutch enables the external casing to be rotatable independently of the internal casing,
   wherein the clutch comprises an internal casing-side toothing formed on a rim of the internal casing that faces the external casing and an external casing-side toothing formed on a rim of the external casing that faces the internal casing so that the external casing-side toothing meshes with the internal casing-side toothing, and
   wherein the maintaining member is a mover which is away from the internal casing-side toothing and the external casing-side toothing when the internal casing-side toothing and the external casing-side toothing mesh with each other, and which is placed between the internal casing-side toothing and the external casing-side toothing when the external casing-side toothing is separated from the internal casing-side toothing.

2. The cap according to claim 1, further comprising:
   at least one annular positioning recess formed in the outer circumferential face of the internal casing, and
   at least one ball arranged in at least one ball-fitting hole formed in the inner face of the external casing, the at least one ball biased by a biasing member and pressing the outer circumferential face of the internal casing,
   wherein, when the at least one ball falls in the at least one positioning recess, the external casing-side toothing is separated from the internal casing-side toothing and the external casing is rotatable with respect to the internal casing.

* * * * *